United States Patent
Huang et al.

(10) Patent No.: US 11,483,121 B2
(45) Date of Patent: Oct. 25, 2022

(54) FULL-DUPLEX SELF-INTERFERENCE WEAKENING METHOD AND FULL-DUPLEX SELF-INTERFERENCE WEAKENING SYSTEM

(71) Applicant: HUAWEI TECHNOLOGIES CO., LTD., Guangdong (CN)

(72) Inventors: Jingjing Huang, Shenzhen (CN); Ming Gan, Shenzhen (CN); Xin Zuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 17/072,589

(22) Filed: Oct. 16, 2020

(65) Prior Publication Data

US 2021/0036837 A1    Feb. 4, 2021

Related U.S. Application Data

(63) Continuation of application No. PCT/CN2019/079415, filed on Mar. 25, 2019.

(30) Foreign Application Priority Data

Apr. 19, 2018    (CN) .................... 201810356505.X (51) Int. Cl.
   *H04L 5/14*    (2006.01)
   *H04B 1/12*    (2006.01)
(52) U.S. Cl.
   CPC ............. *H04L 5/1461* (2013.01); *H04B 1/12* (2013.01)
(58) Field of Classification Search
   CPC ....... H04L 5/1461; H04L 5/0023; H04L 5/14; H04B 1/12; H04B 1/525
   See application file for complete search history.

(56) References Cited

U.S. PATENT DOCUMENTS

| 9,577,813 B2 | 2/2017 | Karjalainen et al. |
| 10,298,336 B1 * | 5/2019 | Tabatabai ............... H04B 1/525 |

(Continued)

FOREIGN PATENT DOCUMENTS

| CN | 102769487 A | 11/2012 |
| CN | 103338172 A | 10/2013 |

(Continued)

OTHER PUBLICATIONS

Office Action issued in Chinese Application No. 201810356505.X dated Jul. 30, 2021, 15 pages (with English translation).

(Continued)

*Primary Examiner* — Jeffrey M Rutkowski
*Assistant Examiner* — Chae S Lee
(74) *Attorney, Agent, or Firm* — Fish & Richardson P.C.

(57) ABSTRACT

This application provides a full-duplex self-interference weakening method and a full-duplex self-interference weakening system. The full-duplex self-interference weakening method includes: separately receiving, by a first port of a dual-polarized receive antenna and a second port of the dual-polarized receive antenna, a signal sent by a transmit antenna and adjusting and combining the signal received by the first port of the dual-polarized receive antenna and/or the signal received by the second port of the dual-polarized receive antenna, to weaken interference caused by the transmit antenna to the dual-polarized receive antenna. The full-duplex self-interference weakening method and the full-duplex self-interference weakening system provided in this application resolve a problem that a quantity of antennas and an antenna location are limited in an existing antenna interference cancelation method.

12 Claims, 5 Drawing Sheets

(56) References Cited

U.S. PATENT DOCUMENTS

| | | | |
|---|---|---|---|
| 2009/0059355 A1* | 3/2009 | Wang | G02F 1/3519 359/344 |
| 2015/0341157 A1 | 11/2015 | Eltawil et al. | |
| 2016/0380669 A1* | 12/2016 | Liu | H04L 27/34 375/219 |
| 2019/0132041 A1* | 5/2019 | Takei | H04W 72/1289 |

FOREIGN PATENT DOCUMENTS

| | | |
|---|---|---|
| CN | 103701480 A | 4/2014 |
| CN | 104052531 A | 9/2014 |
| CN | 104168052 A | 11/2014 |
| CN | 104170340 A | 11/2014 |
| CN | 104539309 A | 4/2015 |
| CN | 106025547 A | 10/2016 |
| CN | 106063135 A | 10/2016 |
| CN | 106209151 A | 12/2016 |
| CN | 107431673 A | 12/2017 |
| CN | 107580758 A | 1/2018 |
| WO | 2015131397 A1 | 9/2015 |

OTHER PUBLICATIONS

PCT International Search Report and Written Opinion issued in International Application No. PCT/CN2019/079415 dated Jun. 3, 2019, 15 pages (with English translation).

\* cited by examiner

FULL-DUPLEX SELF-INTERFERENCE WEAKENING METHOD AND FULL-DUPLEX SELF-INTERFERENCE WEAKENING SYSTEM

CROSS-REFERENCE TO RELATED APPLICATIONS

This application is a continuation of International Application No. PCT/CN2019/079415, filed on Mar. 25, 2019, which claims priority to Chinese Patent Application No. 201810356505.X, filed on Apr. 19, 2018. The disclosures of the aforementioned applications are hereby incorporated by reference in their entireties.

TECHNICAL FIELD

This application relates to the communications field, and in particular, to a full-duplex self-interference weakening method and a full-duplex self-interference weakening system.

BACKGROUND

To alleviate a problem that radio spectrum resources are increasingly scarce as wireless devices exponentially increase, a co-frequency full duplex (Co-time Co-frequency Full Duplex, CCFD) technology is usually used in the communications field to improve utilization of the radio spectrum resources. Compared with a conventional half duplex (Half Duplex, HD) mode (for example, a frequency division duplex mode or a time division duplex mode), spectrum utilization nearly doubles in a CCFD mode. A CCFD system usually includes a receiver and a transmitter. Because a receive antenna of the receiver is relatively close to a transmit antenna of the transmitter, the receive antenna receives a signal sent by the transmit antenna. Therefore, the signal sent by the transmit antenna severely affects normal receiving performed by the receive antenna. In the CCFD system, interference caused by the transmit antenna to the receive antenna is referred to as self-interference. Self-interference cancelation is a hot research topic for implementing a full-duplex technology.

Many researches have been made on a full-duplex self-interference cancelation technology in the industry at home and abroad, and the self-interference cancelation technology includes antenna interference cancelation. In an antenna interference cancelation method, a CCFD system includes two transmit antennas and one receive antenna, a distance from one of the two transmit antennas to the receive antenna is d, and a distance from the other one of the two transmit antennas to the receive antenna is $d+n\lambda/2$, where n is an odd number, and $\lambda$ is a wavelength. In this way, there is a latency of half a wavelength when signals from the two transmit antennas arrive at the receive antenna, that is, interference signals received by the receive antenna from the two transmit antennas have a phase difference of $\pi$, so that the signals transmitted from the two transmit antennas are superimposed and canceled out when arriving at the receive antenna. Therefore, self-interference is significantly attenuated.

However, the foregoing antenna interference cancelation method requires three antennas, and has a relatively high requirement on relative locations of the three antennas. Therefore, the foregoing antenna interference cancelation method has a problem that a quantity of antennas and an antenna location are limited.

SUMMARY

Embodiments of this application provide a full-duplex self-interference weakening method and a full-duplex self-interference weakening system, to resolve a problem that a quantity of antennas and an antenna location are limited in an existing antenna interference cancelation method.

According to a first aspect, an embodiment of this application provides a full-duplex self-interference weakening method, applied to a full-duplex self-interference weakening system, where the full-duplex self-interference weakening system may include at least a dual-polarized receive antenna and a transmit antenna: and the full-duplex self-interference weakening method includes:

separately receiving, by a first port of the dual-polarized receive antenna and a second port of the dual-polarized receive antenna, a signal sent by the transmit antenna; and adjusting and combining the signal received by the first port of the dual-polarized receive antenna and/or the signal received by the second port of the dual-polarized receive antenna, to weaken interference caused by the transmit antenna to the dual-polarized receive antenna.

The two ports of the dual-polarized receive antenna in the full-duplex self-interference weakening system simultaneously receive the signal sent by the transmit antenna, at least one of the signals received by the two ports is adjusted, and the two signals including the adjusted signal are combined, so that self-interference is weakened. According to the full-duplex self-interference weakening system in this embodiment of this application, a quantity of antennas is reduced, and costs are reduced; in addition, there is no requirement on a spatial location between the transmit antenna and the receive antenna, so that costs of the full-duplex system are reduced, and a problem that an antenna location is limited in the full-duplex system is resolved.

In addition, the transmit antenna and the dual-polarized receive antenna in the full-duplex self-interference weakening system to which this embodiment of this application is applied are omnidirectional antennas, and have relatively large signal coverage.

In a first possible implementation of the first aspect, the first port of the dual-polarized receive antenna has a first polarization direction, the second port of the dual-polarized receive antenna has a second polarization direction, the transmit antenna has a third polarization direction, and the first polarization direction, the second polarization direction, and the third polarization direction are orthogonal to each other.

Both the polarization directions of the first port and the second port of the dual-polarized receive antenna are orthogonal to the third polarization direction of the transmit antenna, so that both the first port and the second port of the dual-polarized receive antenna are isolated from a transmit port of the transmit antenna. In this way, interference signals received by the first port and the second port of the dual-polarized receive antenna are weakened, and the weakened interference signals received by the first port and the second port are adjusted and combined, to further weaken the interference caused by the transmit antenna to the dual-polarized receive antenna. In addition, the polarization directions of the two ports of the dual-polarized receive antenna are orthogonal to the polarization direction of the transmit antenna, so that a signal having a larger amplitude is determined in the signals received by the two ports of the dual-polarized receive antenna, and an amplitude of the signal having the larger amplitude is attenuated and a phase of the signal having the larger amplitude is adjusted; in addition, the signals are combined after the signal is adjusted. Therefore, the self-interference is weakened. The signal having the larger amplitude is determined, so that a problem that interference is introduced because an active component is introduced into the full-duplex self-interference weakening system to amplify an amplitude of a signal having a smaller amplitude can be avoided, a self-interference weakening effect is improved, and simplification of an adjustment circuit for adjusting the signals received by the two receive ports of the dual-polarized receive antenna in the full-duplex self-interference weakening system is facilitated, thereby simplifying a structure of the full-duplex self-interference weakening system.

In a second possible implementation of the first aspect, the adjusting and combining the signal received by the first port of the dual-polarized receive antenna and/or the signal received by the second port of the dual-polarized receive antenna includes:

adjusting a phase and an amplitude of the signal received by the first port of the dual-polarized receive antenna, and combining the adjusted signal with the signal received by the second port of the dual-polarized receive antenna; or adjusting a phase and an amplitude of the signal received by the second port of the dual-polarized receive antenna, and combining the adjusted signal with the signal received by the first port of the dual-polarized receive antenna; or adjusting phases and amplitudes of the signal received by the first port of the dual-polarized receive antenna and the signal received by the second port of the dual-polarized receive antenna, and combining the adjusted signals.

With reference to the second possible implementation of the first aspect, in a possible implementation, a phase difference between the two to-be-combined signals is an odd multiple of 180 degrees, and the amplitudes of the two to-be-combined signals are the same.

Self-interference can be canceled by adjusting the phase difference between the to-be-combined signals to the odd multiple of 180 degrees and adjusting the amplitudes of the to-be-combined signals to be the same.

According to a second aspect, this application provides a full-duplex self-interference weakening system, where the system is configured to perform the method according to any one of the first aspect or the possible implementations of the first aspect, and has technical effects the same as that of the method according to any one of the first aspect or the possible implementations of the first aspect. Specifically, the system includes a module or a component configured to perform the method according to any one of the first aspect or the possible implementations of the first aspect.

According to the second aspect, the full-duplex self-interference weakening system provided in this embodiment of this application includes a transmit antenna, a dual-polarized receive antenna, a signal processor, and a combiner, where the transmit antenna sends a signal;

a first port of the dual-polarized receive antenna and a second port of the dual-polarized receive antenna separately receive the signal sent by the transmit antenna;

the signal processor adjusts the signal received by the first port of the dual-polarized receive antenna and/or the signal received by the second port of the dual-polarized receive antenna; and the combiner combines the two signals including the adjusted signal, to weaken interference caused by the transmit antenna to the dual-polarized receive antenna.

In a first possible implementation of the second aspect, the first port of the dual-polarized receive antenna has a first polarization direction, the second port of the dual-polarized receive antenna has a second polarization direction, the transmit antenna has a third polarization direction, and the first polarization direction, the second polarization direction, and the third polarization direction are orthogonal to each other.

In a second possible implementation of the second aspect, the signal processor adjusts a phase and an amplitude of the signal received by the first port of the dual-polarized receive antenna, and the combiner combines the adjusted signal with the signal received by the second port of the dual-polarized receive antenna; or the signal processor adjusts a phase and an amplitude of the signal received by the second port of the dual-polarized receive antenna, and the combiner combines the adjusted signal with the signal received by the first port of the dual-polarized receive antenna; or the signal processor adjusts phases and amplitudes of the signal received by the first port of the dual-polarized receive antenna and the signal received by the second port of the dual-polarized receive antenna, and the combiner combines the adjusted signals.

With reference to the second possible implementation of the second aspect, in a possible implementation, a phase difference between the two to-be-combined signals is an odd multiple of 180 degrees, and the amplitudes of the two to-be-combined signals are the same.

Based on the implementations according to the foregoing aspects, the implementations may further be combined in this application to provide more implementations.

DESCRIPTION OF EMBODIMENTS

The following describes the technical solutions in the embodiments of this application with reference to the accompanying drawings in the embodiments of this application.

Figure 1:
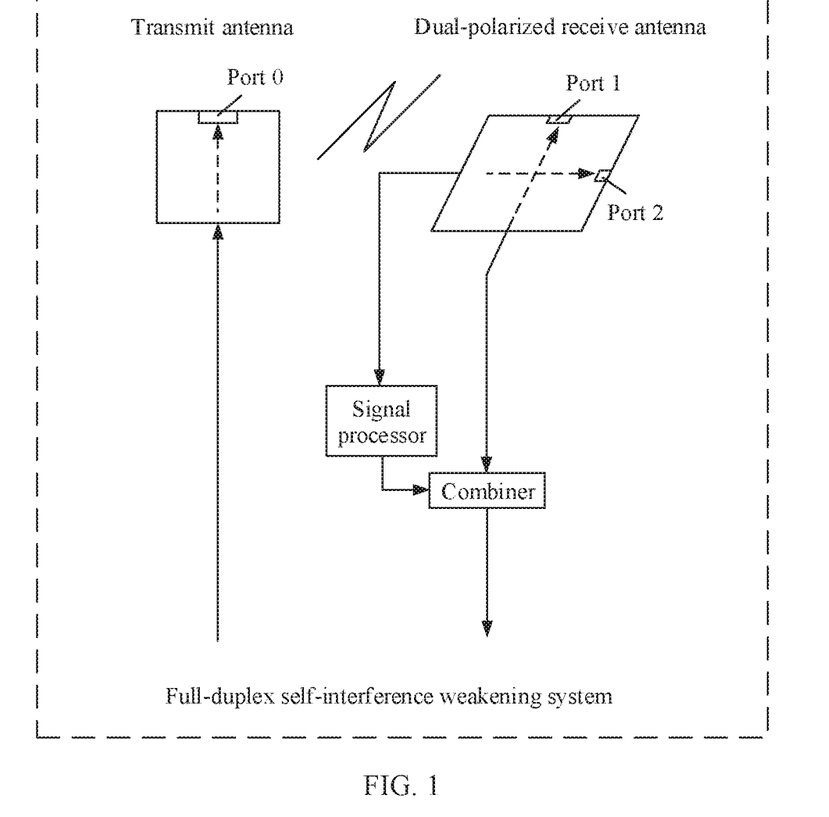
FIG. 1 shows a full-duplex self-interference weakening system to which an embodiment of this application is applicable.

FIG. 1 shows a full-duplex self-interference weakening system to which an embodiment of this application is applicable. As shown in FIG. 1, the full-duplex self-interference weakening system provided in this embodiment includes at least a transmit antenna, a dual-polarized receive antenna, a signal processor, and a combiner. The transmit antenna sends a signal to the outside through a transmit port 0. Two receive ports, for example, a port 1 and a port 2 in FIG. 1, of the dual-polarized receive antenna simultaneously receive the signal that is sent by the transmit antenna through the port 0. In this embodiment of this application, the two receive ports separately receive the signal, the signal processor adjusts at least one of the signals received by the two receive ports, and the combiner combines the two signals including the adjusted signal, so that the signals received by the receive antenna cancel each other out, thereby weakening interference caused by the transmit antenna to the dual-polarized receive antenna.

A full-duplex self-interference weakening method according to the embodiments of this application is described below with reference to FIG. 1.

Figure 2:
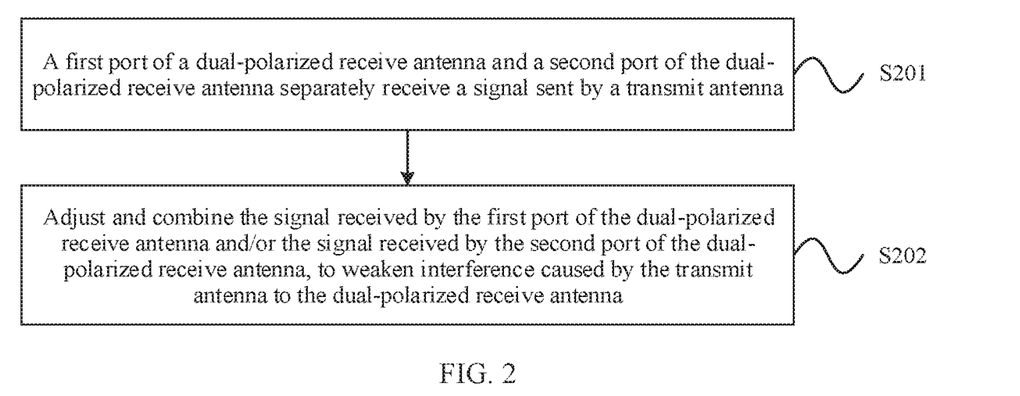
FIG. 2 is a schematic flowchart of a full-duplex self-interference weakening method according to Embodiment 1 of this application.

FIG. 2 is a schematic flowchart of a full-duplex self-interference weakening method according to Embodiment 1 of this application. The method may be applied to the full-duplex self-interference weakening system shown in FIG. 1. As shown in FIG. 2, the full-duplex self-interference weakening method includes the following steps.

S201: A first port of the dual-polarized receive antenna and a second port of the dual-polarized receive antenna separately receive a signal sent by the transmit antenna.

For example, the dual-polarized receive antenna is used in the full-duplex self-interference weakening system in this embodiment of this application. The dual-polarized receive antenna has two polarization directions. As shown in FIG. 1, the dual-polarized receive antenna includes the first port (namely, the port 1 in FIG. 1) and the second port (namely, the port 2 in FIG. 1), each of the two ports corresponds to one polarization direction, and the polarization direction is a direction of an electric field formed during antenna radiation.

For example, when the transmit antenna in the full-duplex self-interference weakening system sends a signal to the outside, the dual-polarized receive antenna in the same system also receives the signal. This affects normal signal receiving performed by the dual-polarized receive antenna, and consequently, the transmit antenna interferes with the dual-polarized receive antenna.

In a specific signal receiving process, the two ports of the dual-polarized receive antenna have a same phase center, namely, a phase center of the receive antenna. Therefore, phases of signals received by the two ports are the same. However, because the two ports have different polarization directions, strengths of the signal sent by the transmit antenna in the different polarization directions may be different. Therefore, amplitudes of the signals received by the two ports may be different. Therefore, the two signals received by the two ports of the dual-polarized receive antenna have the same phase but the different amplitudes.

S202: Adjust and combine the signal received by the first port of the dual-polarized receive antenna and/or the signal received by the second port of the dual-polarized receive antenna, to weaken the interference caused by the transmit antenna to the dual-polarized receive antenna.

For example, the first port and the second port of the dual-polarized receive antenna are used to simultaneously receive the signal sent by the transmit antenna, so that two signals having different amplitudes may be obtained. Therefore, the two signals can be used to suppress each other, to weaken the interference caused by the transmit antenna to the dual-polarized receive antenna.

Specifically, to implement mutual suppression, at least one of the signals received by the first port and the second port may be adjusted. After the adjustment, amplitudes of the two to-be-combined signals are closer. In addition, it is considered that the signal sent by the transmit antenna is a sine wave, so that after the adjustment, a phase difference between the two to-be-combined signals is also closer to 180 degrees. In this case, the two to-be-combined signals may be combined to weaken the self-interference.

For example, only the signal received by the first port may be adjusted, or only the signal received by the second port may be adjusted, or both the signals received by the two ports may be adjusted. After the signal is adjusted, the signals are combined to weaken the self-interference. Correspondingly, when only the signal received by the first port is adjusted, the signal received by the second port and the adjusted signal received by the first port are combined. Correspondingly, when only the signal received by the second port is adjusted, the signal received by the first port and the adjusted signal received by the second port are combined. When both the signals received by the first port and the second port are adjusted, the adjusted signal received by the first port and the adjusted signal received by the second port are combined.

In the full-duplex self-interference weakening method provided in this embodiment of this application, the two ports of the dual-polarized receive antenna in the full-duplex self-interference weakening system simultaneously receive the signal sent by the transmit antenna, at least one of the signals received by the two ports is adjusted, and signal combination is performed after the adjustment, so that the self-interference is weakened.

The two ports of the dual-polarized receive antenna in the full-duplex self-interference weakening system simultaneously receive the signal sent by the transmit antenna, at least one of the signals received by the two ports is adjusted, and the two signals including the adjusted signal are combined, so that the self-interference is weakened. According to the full-duplex self-interference weakening system in this embodiment of this application, a quantity of antennas is reduced, and costs are reduced; in addition, there is no requirement on a spatial location between the transmit antenna and the receive antenna, so that costs of the full-duplex system are reduced, and a problem that an antenna location is limited in the full-duplex system is resolved.

In addition, the transmit antenna and the dual-polarized receive antenna in the full-duplex self-interference weakening system to which this embodiment of this application is applied are omnidirectional antennas, and have relatively large signal coverage.

Optionally, based on the foregoing embodiment, an embodiment of this application further provides a full-duplex self-interference weakening method. In this embodiment, a signal adjustment manner is described in detail.

In this embodiment of this application, the adjusting the signal received by the first port of the dual-polarized receive antenna and/or the signal received by the second port of the dual-polarized receive antenna specifically includes: adjusting a phase and an amplitude of the signal received by the first port of the dual-polarized receive antenna and/or a phase and an amplitude of the signal received by the second port of the dual-polarized receive antenna.

The adjusting the signal received by the first port of the dual-polarized receive antenna or the signal received by the second port of the dual-polarized receive antenna specifically includes: adjusting a phase and an amplitude of the signal received by the first port of the dual-polarized receive antenna or a phase and an amplitude of the signal received by the second port of the dual-polarized receive antenna. Optionally, the amplitude adjustment may be amplitude amplification and amplitude reduction, and the phase adjustment may be a forward phase shift or a backward phase shift.

The adjusting the signal received by the first port of the dual-polarized receive antenna and the signal received by the second port of the dual-polarized receive antenna includes at least one of the following:

adjusting a phase and an amplitude of the signal received by the first port of the dual-polarized receive antenna, and adjusting a phase and an amplitude of the signal received by the second port of the dual-polarized receive antenna; or adjusting a phase and an amplitude of the signal received by the first port of the dual-polarized receive antenna, and adjusting a phase of the signal received by the second port of the dual-polarized receive antenna; or adjusting a phase and an amplitude of the signal received by the first port of the dual-polarized receive antenna, and adjusting an amplitude of the signal received by the second port of the dual-polarized receive antenna; or adjusting a phase of the signal received by the first port of the dual-polarized receive antenna, and adjusting a phase and an amplitude of the signal received by the second port of the dual-polarized receive antenna; or adjusting a phase of the signal received by the first port of the dual-polarized receive antenna, and adjusting an amplitude of the signal received by the second port of the dual-polarized receive antenna; or adjusting an amplitude of the signal received by the first port of the dual-polarized receive antenna, and adjusting a phase and an amplitude of the signal received by the second port of the dual-polarized receive antenna; or adjusting an amplitude of the signal received by the first port of the dual-polarized receive antenna, and adjusting a phase of the signal received by the second port of the dual-polarized receive antenna.

Optionally, the amplitude adjustment may be amplitude amplification of a single signal, amplitude reduction of a single signal, amplitude amplification of two signals by different times, amplitude reduction of two signals by different times, or amplitude amplification of one of two signals and amplitude reduction of the other one of the two signals. The phase adjustment may be a forward phase shift of a single signal, a backward phase shift of a single signal, forward phase shifts of two signals by different degrees, phase shifts of two signals by different degrees, or phase shifts of two signals in different directions.

In this embodiment of this application, the phase and the amplitude of the signal received by the first port of the dual-polarized receive antenna and/or the phase and the amplitude of the signal received by the second port of the dual-polarized receive antenna are adjusted, so that adjusted amplitudes of the two signals are closer, and a phase difference between the two signals is closer to 180 degrees. In this way, the self-interference is weakened when the two signals are combined.

Further, based on the foregoing embodiment, an embodiment of this application further provides a full-duplex self-interference weakening method. In this embodiment, to improve a self-interference weakening effect, after the signal received by the first port of the dual-polarized receive antenna and/or the signal received by the second port of the dual-polarized receive antenna are/is adjusted, the phase difference between the to-be-combined signals is an odd multiple of 180 degrees, and the amplitudes of the to-be-combined signals are the same, so that full-duplex self-interference is canceled.

Specifically, when the phase and the amplitude of the signal received by the first port of the dual-polarized receive antenna are adjusted, the adjusted signal received by the first port is combined with the signal received by the second port, where the phase difference between the adjusted signal received by the first port and the signal received by the second port is an odd multiple of 180 degrees, and the amplitudes of the adjusted signal received by the first port and the signal received by the second port are the same.

When the phase and the amplitude of the signal received by the second port of the dual-polarized receive antenna are adjusted, the adjusted signal received by the second port is combined with the signal received by the first port, where the phase difference between the adjusted signal received by the second port and the signal received by the first port is an odd multiple of 180 degrees, and the amplitudes of the adjusted signal received by the second port and the signal received by the first port are the same.

Specifically, when the signal received by the first port of the dual-polarized receive antenna and the signal received by the second port of the dual-polarized receive antenna are adjusted, the adjusted signal received by the first port is combined with the adjusted signal received by the second port, where the phase difference between the adjusted signal received by the first port and the adjusted signal received by the second port is an odd multiple of 180 degrees, and the amplitudes of the adjusted signal received by the first port and the adjusted signal received by the second port are the same.

In this embodiment of this application, the phase difference between the to-be-combined signals is adjusted to the odd multiple of 180 degrees and the amplitudes of the to-be-combined signals are adjusted to be the same, so that the two signals cancel each other out after being combined, thereby canceling the self-interference.

Further, based on any one of the foregoing embodiments, an embodiment of this application further provides a full-duplex self-interference weakening method. In this embodiment, the first port of the dual-polarized receive antenna has a first polarization direction, the second port of the dual-polarized receive antenna has a second polarization direction, the transmit antenna has a third polarization direction, and the first polarization direction, the second polarization direction, and the third polarization direction are orthogonal to each other, so that the self-interference weakening effect is further improved.

For example, both the polarization directions of the first port and the second port of the dual-polarized receive antenna are orthogonal to the third polarization direction of the transmit antenna, so that both the first port and the second port of the dual-polarized receive antenna are isolated from a transmit port of the transmit antenna. In this way, interference signals received by the first port and the second port of the dual-polarized receive antenna are weakened, and in this embodiment of this application, the weakened interference signals received by the first port and the second port are adjusted and combined, to further weaken the interference caused by the transmit antenna to the dual-polarized receive antenna.

In addition, the polarization directions of the two ports of the dual-polarized receive antenna are orthogonal to the polarization direction of the transmit antenna, so that a signal having a larger amplitude is determined in the signals received by the two ports of the dual-polarized receive antenna, and an amplitude of the signal having the larger amplitude is attenuated and a phase of the signal having the larger amplitude is adjusted; in addition, the signals are combined after the signal is adjusted. Therefore, the self-interference is weakened. The signal having the larger amplitude is determined, so that a problem that interference is introduced because an active component is introduced into the full-duplex self-interference weakening system to amplify an amplitude of a signal having a smaller amplitude can be avoided, the self-interference weakening effect is improved, and simplification of an adjustment circuit for adjusting the signals received by the two receive ports of the dual-polarized receive antenna in the full-duplex self-interference weakening system is facilitated, thereby simplifying a structure of the full-duplex self-interference weakening system.

An example in which determining of a signal having a larger amplitude in signals received by the two ports of the dual-polarized receive antenna is facilitated when the polarization directions of the two ports of the dual-polarized receive antenna are orthogonal to the polarization direction of the transmit antenna is used below for description.

In an actual use process of the full-duplex self-interference weakening system, it is assumed that a phase center of the transmit antenna is located on a Z axis in a spatial rectangular coordinate system, and a phase center of the dual-polarized receive antenna is located on an X axis. In this case, a direction vector from the transmit antenna to the dual-polarized receive antenna is denoted as $\vec{R}$, and $\vec{R}$ is a propagation direction of a signal sent by the transmit antenna.

Figure 3:
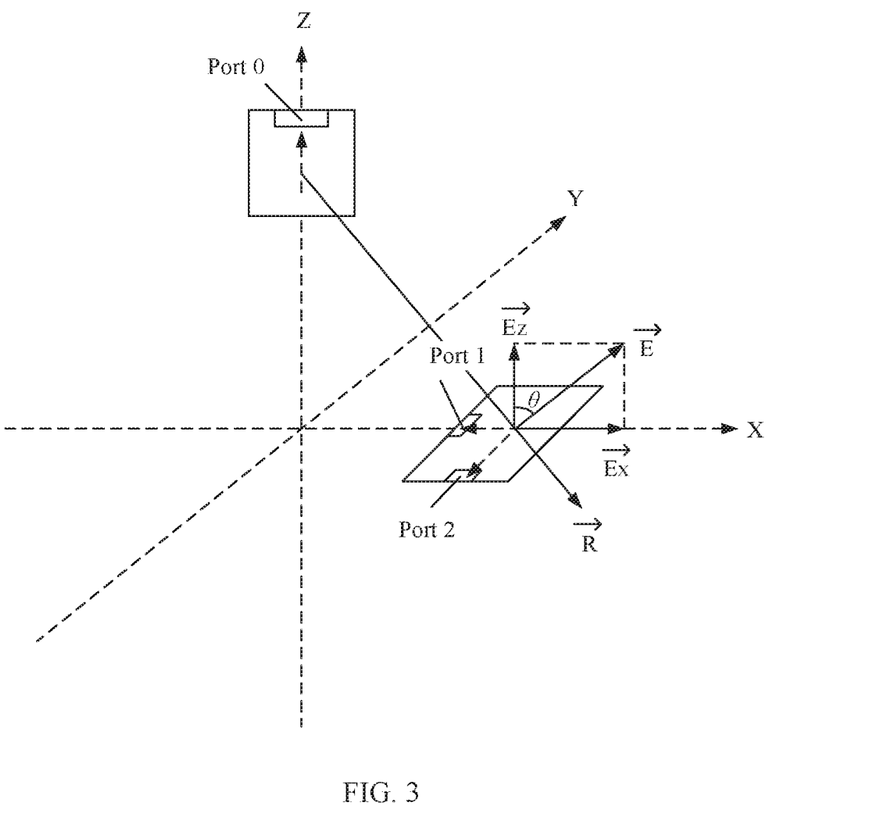
FIG. 3 is a first schematic diagram of a principle of a full-duplex self-interference weakening method according to an embodiment of this application.

For example, when the polarization direction of the transmit antenna is specified as the Z axis, FIG. 3 is a first schematic diagram of a principle of a full-duplex self-interference weakening method according to an embodiment of this application. As shown in FIG. 3, a third polarization direction of a transmit antenna is a Z axis in a spatial rectangular coordinate system, a first polarization direction of a first port of a dual-polarized transmit antenna is an X axis in the spatial rectangular coordinate system, and a second polarization direction of a second port of the dual-polarized transmit antenna is a Y axis in the spatial rectangular coordinate system. The polarization direction of the first port (for example, a port 1 in FIG. 3) of the dual-polarized receive antenna is along the X axis, and the polarization direction of the second port (for example, a port 2 in FIG. 3) of the dual-polarized receive antenna is along the Y axis.

In this case, an angle between a signal propagation direction $\vec{R}$ and the X axis is denoted as θ, and an electric field that is excited by the transmit antenna and that is at the dual-polarized receive antenna is denoted as $\vec{E}$. Therefore, there is also an angle θ between the electric field $\vec{E}$ and the Z axis. The electric field $\vec{E}$ may be decomposed into two components: a component $\vec{E}_x$ along the X axis and a component $\vec{E}_z$ along the Z axis.

Because the polarization direction corresponding to the port 2 is along the Y axis, the polarization direction of the port 2 is orthogonal to both the two components $\vec{E}_x$ and $\vec{E}_z$ of the electric field $\vec{E}$. Because the polarization direction corresponding to the port 1 is along the X axis, the polarization direction of the port 1 is orthogonal to the component $\vec{E}_z$ that is of the electric field $\vec{E}$ and that is along the Z axis, and is parallel to the component $\vec{E}_x$ that is of the electric field $\vec{E}$ and that is along the X axis. Therefore, a strength of a signal received by the port 1 is greater than a strength of a signal received by the port 2. In addition, because phase centers of the two ports coincide, it may be considered that phases of the signals received by the two ports are the same.

In this case, the signal received by the port 1 is adjusted, and the adjusted signal is combined with the signal received by the port 2, so that a self-interference weakening effect can be achieved. Further, the phase and an amplitude of the signal received by the port 1 may be adjusted. Specifically, the amplitude of the signal received by the first port is attenuated to be the same as an amplitude of the signal received by the port 2, and the phase of the signal received by the first port is adjusted to be 180 degrees different from the phase of the signal received by the port 2. In this case, the adjusted signal received by the port 1 is combined with the signal received by the port 2, so that a self-interference cancelation effect can be achieved.

Figure 4:
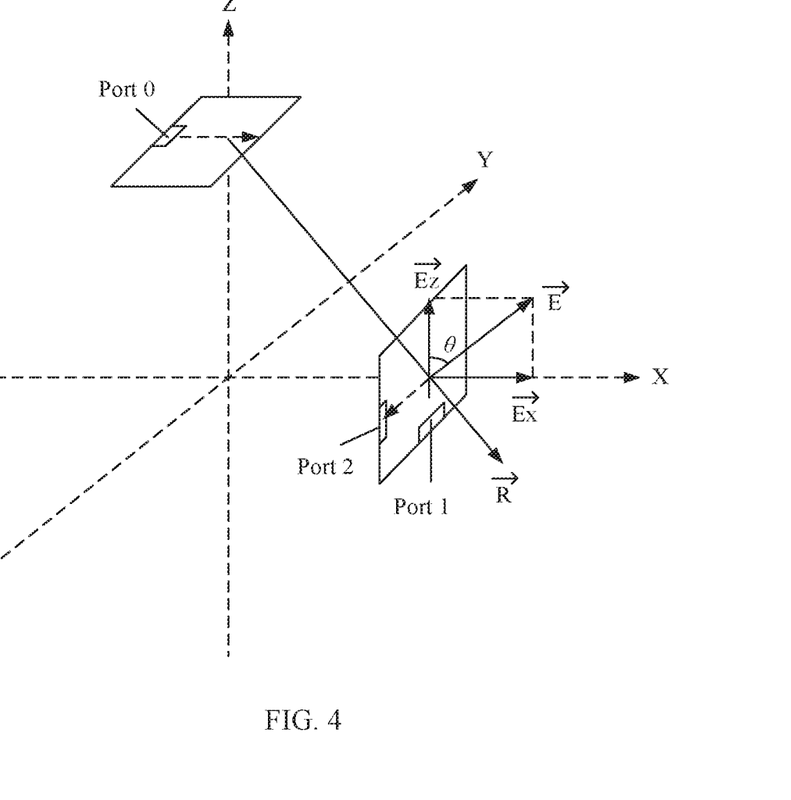
FIG. 4 is a second schematic diagram of a principle of a full-duplex self-interference weakening method according to an embodiment of this application.

For example, when the polarization direction of the transmit antenna is specified as the X axis, FIG. 4 is a second schematic diagram of a principle of a full-duplex self-interference weakening method according to an embodiment of this application. As shown in FIG. 4, a third polarization direction of a transmit antenna is an X axis in a spatial rectangular coordinate system, a first polarization direction of a first port of a dual-polarized transmit antenna is a Z axis in the spatial rectangular coordinate system, and a second polarization direction of a second port of the dual-polarized transmit antenna is a Y axis in the spatial rectangular coordinate system. The polarization direction of the first port (for example, a port 1 in FIG. 4) of the dual-polarized receive antenna is along the Z axis, and the polarization direction of the second port (for example, a port 2 in FIG. 4) of the dual-polarized receive antenna is along the Y axis.

In this case, an angle between a signal propagation direction $\vec{R}$ and the X axis is denoted as θ, and an electric field that is excited by the transmit antenna and that is at the dual-polarized receive antenna is denoted as $\vec{E}$. Therefore, there is also an angle θ between the electric field $\vec{E}$ and the Z axis. The electric field $\vec{E}$ may be decomposed into two components: a component $\vec{E}_x$ along the X axis and a component $\vec{E}_z$ along the Z axis.

Because the polarization direction corresponding to the port 2 is along the Y axis, the polarization direction of the port 2 is orthogonal to both the two components $\vec{E}_x$ and $\vec{E}_z$ of the electric field $\vec{E}$. Because the polarization direction corresponding to the port 1 is along the Z axis, the polarization direction of the port 1 is parallel to the component $\vec{E}_z$ that is of the electric field $\vec{E}$ and that is along the Z axis, and is orthogonal to the component $\vec{E}_x$ that is of the electric field $\vec{E}$ and that is along the X axis. Therefore, a strength of a signal received by the port 1 is greater than a strength of a signal received by the port 2. In addition, because phase centers of the two ports coincide, it may be considered that phases of the signals received by the two ports are the same.

In this case, the signal received by the port 1 is adjusted, and the adjusted signal is combined with the signal received by the port 2, so that a self-interference weakening effect can be achieved. Further, the phase and an amplitude of the signal received by the port 1 may be adjusted. Specifically, the amplitude of the signal received by the first port is attenuated to be the same as an amplitude of the signal received by the port 2, and the phase of the signal received by the first port is adjusted to be 180 degrees different from the phase of the signal received by the port 2. In this case, the adjusted signal received by the first port is combined with the signal received by the second port, so that a self-interference cancelation effect can be achieved.

Figure 5:
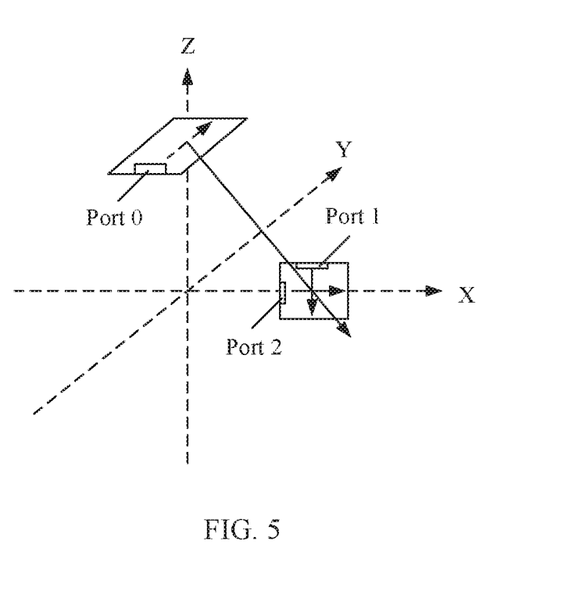
FIG. 5 is a third schematic diagram of a principle of a full-duplex self-interference weakening method according to an embodiment of this application.

For example, when the polarization direction of the transmit antenna is specified as a Y axis, FIG. 5 is a third schematic diagram of a principle of a full-duplex self-interference weakening method according to an embodiment of this application. For example, as shown in FIG. 5, a third polarization direction of a transmit antenna is a Y axis in a spatial rectangular coordinate system, a first polarization direction of a first port of a dual-polarized transmit antenna is an X axis in the spatial rectangular coordinate system, and a second polarization direction of a second port of the dual-polarized transmit antenna is a Z axis in the spatial rectangular coordinate system. The polarization direction of the first port (for example, a port 1 in FIG. 5) of the dual-polarized receive antenna is along the X axis, and the polarization direction of the second port (for example, a port 2 in FIG. 5) of the dual-polarized receive antenna is along the Z axis.

An electric field that is excited by the transmit antenna and that is at the dual-polarized receive antenna is denoted as $\vec{E}$. In this case, a direction of the electric field $\vec{E}$ is the same as that of the Y axis.

Because the polarization direction corresponding to the port 1 is along the Z axis, the polarization direction of the port 1 is orthogonal to the electric field $\vec{E}$. Because the polarization direction corresponding to the port 2 is along the X axis, the polarization direction of the port 2 is also orthogonal to the electric field $\vec{E}$. Therefore, it may be considered that a strength of a signal received by the port 1 is basically the same as a strength of a signal received by the port 2. In addition, because phase centers of the two ports coincide, it may be considered that phases of the signals received by the two ports are the same.

In this case, an amplitude of the signal received by the port 1 or the port 2 is adjusted, and the adjusted signal is combined with the signal that is not adjusted, so that a self-interference weakening effect can be achieved. Further, the phase of the signal received by the port 1 or the port 2 may be adjusted. For example, the phase of the signal received by the port 1 is adjusted to be 180 degrees different from the phase of the signal received by the port 2. In this case, the adjusted signal is combined with the signal received by the port 2, so that a self-interference cancelation effect can be achieved.

In the foregoing embodiments, in the full-duplex self-interference weakening system, the polarization direction of the transmit antenna and the two polarization directions of the dual-polarized receive antenna are orthogonal to each other, and the strengths of the signals received by the two receive ports of the dual-polarized receive antenna may be determined based on the polarization direction of the transmit antenna; in addition, an attenuator is used to attenuate an amplitude of a signal having a higher strength, so that a problem that interference is introduced because an active component is introduced into the full-duplex self-interference weakening system to amplify an amplitude of a signal having a smaller strength can be avoided, and simplification of an adjustment circuit for adjusting the signals received by the two receive ports of the dual-polarized receive antenna in the full-duplex self-interference weakening system is facilitated, thereby simplifying a structure of the full-duplex self-interference weakening system.

Another aspect of the embodiments of this application further provides a full-duplex self-interference weakening system. As shown in FIG. 1, the full-duplex self-interference weakening system includes a transmit antenna, a dual-polarized receive antenna, a signal processor, and a combiner, where the transmit antenna sends a signal;

a first port of the dual-polarized receive antenna and a second port of the dual-polarized receive antenna separately receive the signal sent by the transmit antenna;

the signal processor adjusts the signal received by the first port of the dual-polarized receive antenna and/or the signal received by the second port of the dual-polarized receive antenna; and the combiner combines the two signals including the adjusted signal, to weaken interference caused by the transmit antenna to the dual-polarized receive antenna.

Optionally, the first port of the dual-polarized receive antenna has a first polarization direction, the second port of the dual-polarized receive antenna has a second polarization direction, the transmit antenna has a third polarization direction, and the first polarization direction, the second polarization direction, and the third polarization direction are orthogonal to each other.

Optionally, the signal processor is specifically configured to adjust a phase and an amplitude of the signal received by the first port of the dual-polarized receive antenna and/or a phase and an amplitude of the signal received by the second port of the dual-polarized receive antenna.

For example, FIG. 1 shows a case in which the signal processor is configured to adjust a signal received by the first port of the dual-polarized receive antenna.

Optionally, the signal processor may include an amplitude adjuster and a phase adjuster.

Optionally, a phase difference between the to-be-combined signals is an odd multiple of 180 degrees, and the amplitudes of the to-be-combined signals are the same.

Figure 6:
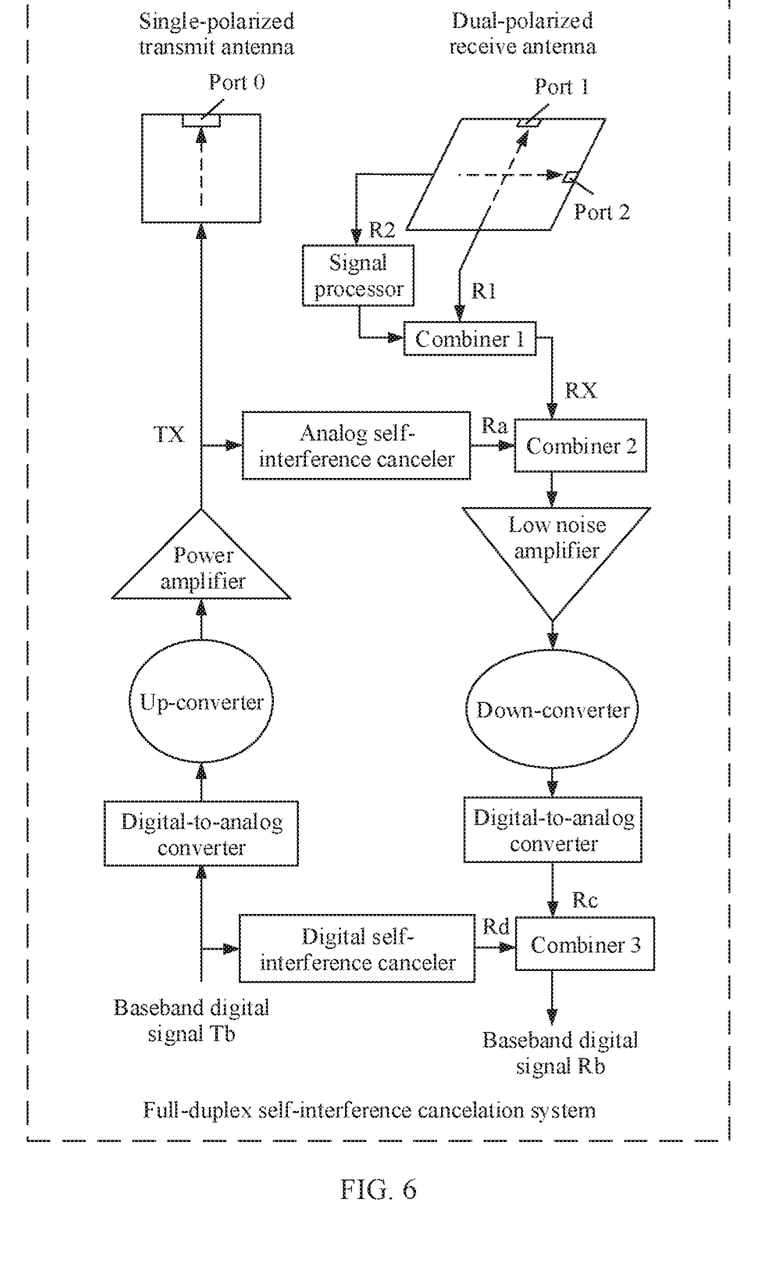
FIG. 6 is a schematic structural diagram of a full-duplex self-interference weakening system according to Embodiment 2 of this application.

For example, based on the embodiment shown in FIG. 1, FIG. 6 is a schematic structural diagram of a full-duplex self-interference weakening system according to Embodiment 2 of this application. As shown in FIG. 6, the full-duplex self-interference weakening system includes a transmit link, a receive link, and a self-interference cancelation circuit. The transmit link includes a digital-to-analog converter, an up-converter, a power amplifier, and a transmit antenna. A to-be-sent baseband digital signal Tb is first input into the digital-to-analog converter, and then sent sequentially through the up-converter, the power amplifier, and the transmit antenna. The receive link includes a dual-polarized receive antenna, a signal processor, a combiner 1, a combiner 2, a low noise amplifier, a down-converter, an analog-to-digital converter, and a combiner 3. A signal received by the dual-polarized receive antenna in the receive link sequentially passes through the signal processor, the combiner 1, the low noise amplifier, the down-converter, and the analog-to-digital converter to complete a signal receiving process, so as to obtain a baseband digital signal Rb on which self-interference is weakened. The self-interference cancelation circuit includes an antenna self-interference canceler, an analog self-interference canceler, and a digital self-interference canceler. The antenna self-interference canceler includes the transmit antenna in the transmit link, and the dual-polarized receive antenna, the signal processor, and the combiner 1 in the receive link. The analog self-interference canceler receives a signal output by the power amplifier, and provides a signal obtained after analog self-interference cancelation to the combiner 2. The digital self-interference canceler receives a baseband digital signal, and provides a signal obtained after digital self-interference cancelation to the combiner 3.

Specifically, a working process of the full-duplex self-interference weakening system is as follows: The transmit link receives a to-be-sent baseband digital signal Tb, and the digital-to-analog converter converts the baseband digital signal Tb into a baseband analog signal. After passing through the up-converter and the power amplifier, the baseband analog signal is converted into a to-be-transmitted radio frequency signal TX, and TX is transmitted through the transmit antenna. When the transmit antenna sends the radio frequency signal TX, the dual-polarized receive antenna receives TX, a first port of the dual-polarized receive antenna receives a first signal R1, and a second port of the dual-polarized receive antenna receives a second signal R2. After the first signal R1 and the second signal R2 pass through the signal processor and the combiner 1, a radio frequency signal RX on which antenna self-interference is canceled is obtained.

The analog self-interference canceler obtains, based on the radio frequency signal TX, a signal Ra approximate to the radio frequency signal RX, and the combiner 2 subtracts Ra from RX, to cancel analog self-interference.

After the analog self-interference cancelation, the radio frequency signal RX is converted into a signal Rc through the low noise amplifier, the down-converter, and the analog-to-digital converter. The digital self-interference canceler obtains, based on the baseband digital signal Tb, a signal Rd approximate to the signal Rc, and then the combiner 3 subtracts Rd from Rc, to cancel digital self-interference.

In the several embodiments provided in this application, it should be understood that the disclosed system, apparatus, and method may be implemented in other manners. For example, the described apparatus embodiment is merely an example. For example, the unit division is merely logical function division and may be other division manners in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations of this application. Any variation or replacement readily figured out by a person skilled in the art based on the specific implementations provided in this application shall fall within the protection scope of this application.

In the specification, the claims, and the accompanying drawings of the present invention, the terms "first", "second", "third", "fourth", and the like are intended to distinguish between similar objects but do not necessarily indicate a specific order or sequence. It should be understood that the data termed in such a way are interchangeable in proper circumstances, so that the embodiments described herein can be implemented in other orders than the order illustrated or described herein. Moreover, the terms "include", "contain" and any other variants mean to cover non-exclusive inclusion, for example, a process, method, system, product, or device that includes a list of steps or units is not necessarily limited to those steps or units, but may include other steps or units not expressly listed or inherent to the process, method, product, or device.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (solid state drive, SSD).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may implement the described functions by using a different method for each specific application.

A person skilled in the art may clearly understand that, for the purpose of convenient and brief description, for a detailed working process of the foregoing system, apparatus, and unit, refer to a corresponding process in the foregoing method embodiments, and details are not described herein again.

What is claimed is:

1. A full-duplex self-interference weakening method, comprising:
    separately receiving, by a first port of a dual-polarized receive antenna and a second port of the dual-polarized receive antenna, a signal sent by a transmit antenna;
    adjusting a phase and an amplitude of the signal received by the first port of the dual-polarized receive antenna according to the phase and the amplitude of the signal received by the second port of the dual-polarized receive antenna; and
    combining the adjusted signal with the signal received by the second port of the dual-polarized receive antenna to weaken interference caused by the transmit antenna to the dual-polarized receive antenna.

2. The method according to claim 1, wherein the first port of the dual-polarized receive antenna has a first polarization direction, the second port of the dual-polarized receive antenna has a second polarization direction, the transmit antenna has a third polarization direction, and the first polarization direction, the second polarization direction, and the third polarization direction are orthogonal to each other.

3. The method according to claim 1, wherein a phase difference between the two to-be-combined signals is an odd multiple of 180 degrees.

4. The method according to claim 1, wherein the amplitudes of the two to-be-combined signals are the same.

5. A full-duplex self-interference weakening system, comprising a transmit antenna, a dual-polarized receive antenna, a signal processor, and a combiner, wherein the transmit antenna sends a signal;
a first port of the dual-polarized receive antenna and a second port of the dual-polarized receive antenna separately receive the signal sent by the transmit antenna;
the signal processor adjusts a phase and an amplitude of the signal received by the first port of the dual-polarized receive antenna according to the phase and the amplitude of the signal received by the second port of the dual-polarized receive antenna; and
the combiner combines the adjusted signal with the signal received by the second port of the dual-polarized receive antenna to weaken interference caused by the transmit antenna to the dual-polarized receive antenna.

6. The system according to claim 5, wherein the first port of the dual-polarized receive antenna has a first polarization direction, the second port of the dual-polarized receive antenna has a second polarization direction, the transmit antenna has a third polarization direction, and the first polarization direction, the second polarization direction, and the third polarization direction are orthogonal to each other.

7. The system according to claim 5, wherein a phase difference between the two to-be-combined signals is an odd multiple of 180 degrees.

8. The system according to claim 5, wherein the amplitudes of the two to-be-combined signals are the same.

9. A wireless device, comprising a transmit antenna, a dual-polarized receive antenna, a signal processor, and a combiner, wherein
the transmit antenna is configured to send a signal;
the dual-polarized receive antenna comprises a first port and a second port, wherein the first port of the dual-polarized receive antenna and the second port of the dual-polarized receive antenna are configured to separately receive the signal sent by the transmit antenna;
the signal processor is configured to adjust a phase and an amplitude of the signal received by the first port of the dual-polarized receive antenna according to the phase and the amplitude of the signal received by the second port of the dual-polarized receive antenna; and
the combiner is configured to combine the adjusted signal with the signal received by the second port of the dual-polarized receive antenna to weaken interference caused by the transmit antenna to the dual-polarized receive antenna.

10. The wireless device according to claim 9, wherein the first port of the dual-polarized receive antenna has a first polarization direction, the second port of the dual-polarized receive antenna has a second polarization direction, the transmit antenna has a third polarization direction, and the first polarization direction, the second polarization direction, and the third polarization direction are orthogonal to each other.

11. The wireless device according to claim 9, wherein a phase difference between the two to-be-combined signals is an odd multiple of 180 degrees.

12. The wireless device according to claim 9, wherein the amplitudes of the two to-be-combined signals are the same.

* * * * *

UNITED STATES PATENT AND TRADEMARK OFFICE
CERTIFICATE OF CORRECTION

| | | |
|---|---|---|
| PATENT NO. | : 11,483,121 B2 | |
| APPLICATION NO. | : 17/072589 | |
| DATED | : October 25, 2022 | |
| INVENTOR(S) | : Jingjing Huang, Ming Gan and Xin Zuo | |

It is certified that error appears in the above-identified patent and that said Letters Patent is hereby corrected as shown below:

On the Title Page

In Column 2 (Abstract), In Line 7, delete "antenna" and insert -- antenna; --

Signed and Sealed this
Ninth Day of May, 2023

Katherine Kelly Vidal
*Director of the United States Patent and Trademark Office*